US009520127B2

(12) United States Patent
Li et al.

(10) Patent No.: US 9,520,127 B2
(45) Date of Patent: Dec. 13, 2016

(54) SHARED HIDDEN LAYER COMBINATION FOR SPEECH RECOGNITION SYSTEMS

(71) Applicant: MICROSOFT TECHNOLOGY LICENSING, LLC, Redmond, WA (US)

(72) Inventors: Jinyu Li, Redmond, WA (US); Jian Xue, Sammamish, WA (US); Yifan Gong, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 2 days.

(21) Appl. No.: 14/265,110

(22) Filed: Apr. 29, 2014

(65) Prior Publication Data

US 2015/0310858 A1 Oct. 29, 2015

(51) Int. Cl.
| | | |
|---|---|---|
| G10L 15/16 | (2006.01) | |
| G10L 25/30 | (2013.01) | |
| G10L 15/32 | (2013.01) | |
| G10L 15/06 | (2013.01) | |
| G10L 15/02 | (2006.01) | |

(52) U.S. Cl.
CPC ............... *G10L 15/16* (2013.01); *G10L 15/32* (2013.01); *G10L 25/30* (2013.01); *G10L 15/02* (2013.01); *G10L 15/063* (2013.01); *G10L 2015/025* (2013.01)

(58) Field of Classification Search
CPC ................................ G10L 15/16; G10L 25/30
USPC ........................................................ 704/232
See application file for complete search history.

(56) References Cited

U.S. PATENT DOCUMENTS

| | | | |
|---|---|---|---|
| 6,167,377 A | 12/2000 | Gillick et al. | |
| 6,185,528 B1 * | 2/2001 | Fissore | G10L 15/26 |
| | | | 704/232 |
| 6,263,308 B1 | 7/2001 | Heckerman | |

(Continued)

FOREIGN PATENT DOCUMENTS

| | | |
|---|---|---|
| EP | 0553101 B1 | 7/1997 |
| EP | 2575128 A2 | 4/2013 |

(Continued)

OTHER PUBLICATIONS

Dahl et al, "Context-Dependent Pre-Trained Deep Neural NEtworks for Large-Vocabulary Speech Recognition," Jan. 2012, IEEE Transaction on Audio, Speech, and Language Processing, vol. 20 Issue 1, pp. 30-42.*

(Continued)

*Primary Examiner* — David Hudspeth
*Assistant Examiner* — Oluwadamilola M Ogunbiyi
(74) *Attorney, Agent, or Firm* — Stephen Spellman; Tom Wong; Micky Minhas (57) ABSTRACT

Providing a framework for merging automatic speech recognition (ASR) systems having a shared deep neural network (DNN) feature transformation is provided. A received utterance may be evaluated to generate a DNN-derived feature from the top hidden layer of a DNN. The top hidden layer output may then be utilized to generate a network including a bottleneck layer and an output layer. Weights representing a feature dimension reduction may then be extracted between the top hidden layer and the bottleneck layer. Scores may then be generated and combined to merge the ASR systems which share the DNN feature transformation.

20 Claims, 8 Drawing Sheets

(56) References Cited

U.S. PATENT DOCUMENTS

| | | | |
|---|---|---|---|
| 6,970,947 | B2 | 11/2005 | Ebling et al. |
| 7,729,902 | B1 | 6/2010 | Gupta |
| 7,835,910 | B1 | 11/2010 | Hakkani-Tur et al. |
| 8,015,006 | B2 | 9/2011 | Kennewick et al. |
| 8,229,729 | B2 | 7/2012 | Sarikaya et al. |
| 8,275,615 | B2 | 9/2012 | Kozat |
| 8,296,107 | B2 | 10/2012 | Turner et al. |
| 8,321,220 | B1 | 11/2012 | Chotimongkol et al. |
| 8,326,634 | B2 | 12/2012 | Di Cristo et al. |
| 8,346,563 | B1 | 1/2013 | Hjelm et al. |
| 8,400,332 | B2 | 3/2013 | Szwabowski et al. |
| 8,412,521 | B2 | 4/2013 | Mathias et al. |
| 8,571,866 | B2 | 10/2013 | Melamed et al. |
| 9,324,323 | B1 | 4/2016 | Bikel et al. |
| 2002/0083041 | A1 | 6/2002 | Achlioptas |
| 2002/0116171 | A1 | 8/2002 | Russell |
| 2003/0125948 | A1 | 7/2003 | Lyudovyk |
| 2003/0212543 | A1 | 11/2003 | Epstein |
| 2003/0212544 | A1 | 11/2003 | Acero |
| 2004/0088726 | A1 | 5/2004 | Ma et al. |
| 2005/0065789 | A1* | 3/2005 | Yacoub ............... G10L 15/32 704/231 |
| 2005/0091057 | A1 | 4/2005 | Phillips et al. |
| 2005/0144013 | A1 | 6/2005 | Fujimoto et al. |
| 2005/0165598 | A1 | 7/2005 | Cote et al. |
| 2006/0036444 | A1* | 2/2006 | Hwang ............... G10L 15/063 704/275 |
| 2007/0038436 | A1 | 2/2007 | Cristo et al. |
| 2007/0128979 | A1 | 6/2007 | Shackelford |
| 2007/0150428 | A1 | 6/2007 | Webb |
| 2007/0156392 | A1 | 7/2007 | Balchandran et al. |
| 2007/0203863 | A1* | 8/2007 | Gupta ............... G06N 99/005 706/20 |
| 2007/0226649 | A1 | 9/2007 | Agmon |
| 2008/0004877 | A1 | 1/2008 | Tian |
| 2008/0195388 | A1 | 8/2008 | Bower et al. |
| 2008/0215183 | A1 | 9/2008 | Chen |
| 2008/0235017 | A1 | 9/2008 | Satomura |
| 2009/0030697 | A1 | 1/2009 | Cerra et al. |
| 2009/0292687 | A1* | 11/2009 | Fan ............... G06F 17/30654 |
| 2010/0004930 | A1* | 1/2010 | Strope ............... G10L 15/32 704/240 |
| 2010/0114890 | A1 | 5/2010 | Hagar |
| 2010/0128863 | A1 | 5/2010 | Krum et al. |
| 2010/0211695 | A1 | 8/2010 | Steinmetz et al. |
| 2010/0312546 | A1 | 12/2010 | Chang et al. |
| 2011/0010171 | A1 | 1/2011 | Talwar et al. |
| 2011/0093459 | A1 | 4/2011 | Dong et al. |
| 2011/0144999 | A1 | 6/2011 | Jang et al. |
| 2011/0153324 | A1 | 6/2011 | Ballinger et al. |
| 2012/0065976 | A1 | 3/2012 | Deng |
| 2012/0084086 | A1* | 4/2012 | Gilbert ............... G10L 15/32 704/235 |
| 2012/0232885 | A1 | 9/2012 | Barbosa et al. |
| 2012/0245944 | A1 | 9/2012 | Gruber |
| 2012/0253799 | A1 | 10/2012 | Bangalore |
| 2012/0253802 | A1 | 10/2012 | Heck et al. |
| 2012/0254086 | A1 | 10/2012 | Deng |
| 2012/0254227 | A1 | 10/2012 | Heck et al. |
| 2012/0265531 | A1 | 10/2012 | Bennett |
| 2012/0271617 | A1 | 10/2012 | Nakajima et al. |
| 2012/0290293 | A1 | 11/2012 | Hakkani-Tur et al. |
| 2012/0303565 | A1 | 11/2012 | Deng et al. |
| 2013/0031476 | A1 | 1/2013 | Coin et al. |
| 2013/0085756 | A1 | 4/2013 | Chotimongkol et al. |
| 2013/0138436 | A1 | 5/2013 | Yu |
| 2013/0152092 | A1 | 6/2013 | Yadgar |
| 2013/0163860 | A1* | 6/2013 | Suzuki ............... G06K 9/00718 382/159 |
| 2013/0185065 | A1 | 7/2013 | Tzirkel-Hancock et al. |
| 2014/0025380 | A1 | 1/2014 | Koch et al. |
| 2014/0214410 | A1 | 7/2014 | Jang |
| 2014/0257803 | A1 | 9/2014 | Yu et al. |
| 2014/0358537 | A1* | 12/2014 | Gilbert ............... G10L 15/32 704/235 |
| 2014/0372112 | A1 | 12/2014 | Xue et al. |
| 2014/0379326 | A1 | 12/2014 | Sarikaya et al. |
| 2014/0379353 | A1 | 12/2014 | Boies et al. |
| 2015/0100312 | A1* | 4/2015 | Bocchieri ............... G10L 15/02 704/232 |
| 2015/0161993 | A1* | 6/2015 | Sainath ............... G10L 15/07 704/237 |
| 2015/0161994 | A1* | 6/2015 | Tang ............... G10L 15/02 704/232 |
| 2015/0170020 | A1 | 6/2015 | Garimella |
| 2015/0255061 | A1 | 9/2015 | Xue et al. |
| 2015/0255069 | A1 | 9/2015 | Adams et al. |
| 2015/0278191 | A1 | 10/2015 | Levit et al. |
| 2015/0325236 | A1 | 11/2015 | Levit et al. |
| 2016/0203125 | A1 | 7/2016 | Sarikaya et al. |

FOREIGN PATENT DOCUMENTS

| | | |
|---|---|---|
| JP | 2002091477 A | 3/2002 |
| KR | 20130022513 | 3/2013 |
| WO | WO 2005/013262 A1 | 2/2005 |
| WO | 2013/171481 A2 | 11/2013 |

OTHER PUBLICATIONS

Kumar et al, "Heteroscedastic discrimination analysis and reduced rank HMMs for improves speech recognition" Speech Communication, 1998, vol. 26 pp. 283-297.*

Lilly, et al., "Robust Speech Recognition Using Singular Value Decomposition Based Speech Enhancement," IEEE Tencon, 1997, 4 pgs. (Feb. 27, 2015 OA).

U.S. Official Action dated Feb. 27, 2015 in U.S. Appl. No. 13/920,323, 22 pgs.

U.S. Appl. No. 13/920,323, filed Jun. 18, 2013, entitled "Restructuring Deep Neural Network Acoustic Models".

U.S. Appl. No. 14/201,704, filed Mar. 7, 2014, entitled "Low-Footprint Adaptation and Personalization for a Deep Neural Network".

U.S. Appl. No. 14/273,100, filed May 8, 2014, entitled "Context Specific Language Model Scale Factors".

Abad, et al., "Context Dependent Modelling Approaches for Hybrid Speech Recognizers", In Proceeding of Interspeech, Sep. 26, 2010, 4 pages.

Abdel-Hamid, et al., "Fast Speaker Adaptation of Hybrid NN/HMM Model for Speech Recognition Based on Discriminative Learning of Speaker Code", In IEEE International Conference on Acoustics, Speech and Signal Processing, May 26, 2013, 5 pages.

Abid, et al., "A New Neural Network Pruning Method Based on the Singular Value Decomposition and the Weight Initialisation", In Proceedings of 11th European Signal Processing Conference, Sep. 3, 2002, 4 pages.

Barman, et al., "Nonnegative Matrix Factorization (NMF) Based Supervised Feature Selection and Adaptation", In Proceedings of the 9th International Conference on Intelligent Data Engineering and Automated Learning, Nov. 2, 2008, 2 pages.

Chen, Wei, "Building Language Model on Continuous Space using Gaussian Mixture Models", In Proceedings of Research in Language Modeling, Jan. 2007, 66 pages.

Dahl, et al., "Context-Dependent Pre-Trained Deep Neural Networks for Large Vocabulary Speech Recognition", In IEEE Transactions on Audio, Speech, and Language Processing, vol. 20, Issue 1, Jan. 1, 2012, 13 pages.

Dahl, et al., "Large Vocabulary Continuous Speech Recognition with Context-Dependent DBN-HMMs", In IEEE International Conference on Acoustics, Speech and Signal Processing, May 22, 2011, 4 pages.

Davis, et al., "Low-Rank Approximations for Conditional Feedforward Computation in Deep Neural Networks", In Proceedings of ArXiv preprint arXiv:1312.4461, Dec. 2013, 9 pages.

Deng et al., "Roles of Pre-Training and Fine-Tuning in Context-Dependent DBN-HMMs for Real-Word Speech Recognition", In (56) References Cited

OTHER PUBLICATIONS

Proceeding of NIPS Workshop on Deep Learning and Unsupervised Feature Learning, Dec. 2010, 8 pages.
Gemello, et al., "Adaptation of Hybrid ANN/HMM Models Using Linear Hidden Transformations and Conservative Training", In IEEE International Conference on Acoustics, Speech and Signal Processing, May 14, 2006, 4 pages.
Gruenstein, et al., "Context-Sensitive Language Modeling for Large Sets of Proper Nouns in Multimodal Dialogue Systems", In Proceedings of IEEE/ACL Workshop on Spoken Language Technology, Dec. 10, 2006, 4 pages.
Heck et al.; "Robustness to Telephone Handset Distortion in Speaker Recognition by Discriminative Feature Design"; In Journal of Speech Communication—Speaker Recognition and its Commercial and Forensic Applications, vol. 31, Issue 2-3; Jun. 2000; http://rmcet.com/lib/E-Journals/Speech%20Communication/1-s2.0-S0167639399000771-main.pdf; 12 pgs.
Hinton, et al., "Deep Neural Networks for Acoustic Modeling in Speech Recognition", In IEEE Signal Processing Magazine, vol. 29, Issue 6, Nov. 2012, 27 pages.
Jaitly, et al., "An Application of Pretrained Deep Neural Networks to Large Vocabulary Conversational Speech Recognition", In Proceedings of 13th Annual Conference of the International Speech Communication Association, Mar. 12, 2012, 11 pages.
Konig et al., "Nonlinear Discriminant Feature Extraction for Robust Text-Independent Speaker Recognition"; In Proceeding of the RLA2C, ESCA workshop on Speaker Recognition and its Commercial and Forensic Applications; Apr. 1998; http://www.msr-waypoint.com/pubs/193653/konig_heck_DNN.pdf; 4 pgs.
Singh-Miller et al., "Dimensionality Reduction for Speech Recognition Using Neighborhood Components Analysis"; In Proceedings of 8th Annual Conference of the International Speech Communication Association, Antwerp; Dec. 27, 2007; http://www.cs.columbia.edu/~mcollins/papers/icslp07.pdf; 4 pgs.
Lecouteux et al., "Dynamic Combination of Automatic Speech Recognition Systems by Driven Decoding"; In Journal of IEEE Transactions on Audio, Speech and Language Processing; Jan. 2013; http://hal.archives-ouvertes.fr/docs/00/75/86126/PDF/SystemCombination.pdf; 10 pgs.
Li, et al., "Comparison of Discriminative Input and Output Transformations for Speaker Adaptation in the Hybrid NN/HMM Systems", In Proceedings of 11th Annual Conference of the International Speech Communication Association, Sep. 26, 2010, 4 pages.
Li et al., "Lattice Combination for Improved Speech Recognition"; In Proceedings of the 7th International Conference of Spoken Language Processing; Sep. 16, 2002; http://www.cs.cmu.edu/afs/cs/user/robust/www/Papers/icslp02_xiang.pdf; 4 pgs.
Liu, et al., "Use of Contexts in Language Model Interpolation and Adaptation", In Journal of Computer Speech and Language vol. 27 Issue 1, Feb. 2009, 23 pages.
Liao, Hank, "Speaker Adaptation of Context Dependent Deep Neural Networks", In IEEE International Conference on Acoustics, Speech and Signal Processing, May 26, 2013, 5 pages.
Meinedo et al., "Combination of Acoustic Models in Continuous Speech Recognition Hybrid Systems"; In Proceedings of Sixth International Conference on Spoken Language Processing; Oct. 2000; http://www.inesc-id.pt/pt/indicadores/Ficheiros/416.pdf; 4 pgs.
Mohamed, et al., "Acoustic Modeling Using Deep Belief Networks", In IEEE Transactions on Audio, Speech, and Language Processing, vol. 20, Issue 1, Jan. 2012, 10 pages.
Motlicek et al., "Feature and Score Level Combination of Subspace Gaussinasin LVCSR Task"; In IEEE International Conference on Acoustics, Speech and Signal Processing; May 26, 2013; http://ieeexplore.ieee.org/stamp/stamp.jsp?tp=&arnumber=6639142; 5 pgs.
Novak, et al., "Use of Non-Negative Matrix Factorization for Language Model Adaptation in a Lecture Transcription Task", In Proceedings of IEEE International Conference on Acoustics, Speech, and Signal Processing, vol. 1, May 7, 2001, 4 pages.

Sainath, et al., "Auto-Encoder Bottleneck Features Using Deep Belief Networks", In Proceedings of IEEE International Conference on Acoustics, Speech and Signal Processing, Mar. 25, 2012, 4 pages.
Sainath, et al., "Low-Rank Matrix Factorization for Deep Neural Network Training with High-Dimensional Output Targets", In proceedings of IEEE International Conference on Acoustics, Speech and Signal Processing, May 26, 2013, 5 pages.
Sainath, et al., "Making Deep Belief Networks Effective for Large Vocabulary Continuous Speech Recognition", In Proceedings of IEEE Workshop on Automatic Speech Recognition and Understanding, Dec. 11, 2011, 6 pages.
Saluja, et al., "Context-aware Language Modeling for Conversational Speech Translation", In Proceedings of Machine Translation Summit XIII, Sep. 19, 2011, 8 pages.
Sarukkai, et al., "Improved Spontaneous Dialogue Recognition Using Dialogue and Utterance Triggers by Adaptive Probability Boosting", In Fourth International Conference on Spoken Language, vol. 1, Oct. 3, 1996, 4 pages.
Seide, et al., "Conversational Speech Transcription using Context-Dependent Deep Neural Networks", In Proceeding of 12th Annual Conference of the International Speech Communication Association, Aug. 28, 2011, 4 pages.
Siniscalchi, et al., "Hermitian Based Hidden Activation Functions for Adaptation of Hybrid HMM/ANN Models", In Proceedings of 13th Annual Conference of the International Speech Communication Association, Sep. 9, 2012, 4 pages.
Su et al., "Error Back Propagation for Sequence Training of Context-Dependent Deep Networks for Conversational Speech Transcription"; In IEEE International Conference on Acoustics, Speech, and Signal Processing; May 26, 2013; http://research.microsoft.com/pubs/194345/0006664.pdf; 5 pgs.
Swietojanski et al., "Revisiting Hybrid and GMM-HMM System Combination Techniques"; In Proceeding of the IEEE International Conference on Acoustics, Speech and Signal Processing; May 26, 2013; http://homepages.inf.ed.ac.uk/s11365501data/Swietojanski_ICASSP2013.pdf; 5 pgs.
Trmal, et al., "Adaptation of a Feedforward Artificial Neural Network Using a Linear Transform", In Proceedings of in Text, Speech and Dialogue, Sep. 10, 2010, pp. 8.
Vanhoucke, et al., "Improving the Speed of Neural Networks on CPUs", In Proceedings of NIPS Workshop on Deep Learning and Unsupervised Feature Learning, Dec. 16, 2011, 8 pages.
Xue, et al., "Restructuring of Deep Neural Network Acoustic Models with Singular Value Decomposition", In Proceedings of 14th Annual Conference of the International Speech Communication Association, Aug. 25, 2013, 5 pages.
Yan et al., "A Scalable Approach to Using DSS-Derived Features in GMM-HMM Based Acoustic Modeling for LVCSR"; In Proceeding of the 14th Annual Conference of the International Speech Communication Association; Aug. 25, 2013; http://homepages.inf.ed.ac.uk/s1136550/data/Swietojanski_ICASSP2013.pdf; 5 pgs.
Yao, et al., "Adaptation of Context-Dependent Deep Neural Networks for Automatic Speech Recognition", In IEEE Spoken Language Technology Workshop, Dec. 2, 2012, 4 pages.
Yu, et al., "Exploiting Sparseness in Deep Neural Networks for Large Vocabulary Speech Recognition", In Proceeding of IEEE International Conference on Acoustics, Speech and Signal Processing, Mar. 25, 2012, 4 pages.
Yu, et al., "Improved Bottleneck Features Using Pretrained Deep Neural Networks", In Proceedings of 12th Annual Conference of the International Speech Communication Association, Aug. 28, 2011, 4 pages.
Yu, et al., "KL-Divergence Regularized Deep Neural Network Adaptation for Improved Large Vocabulary Speech Recognition", In IEEE International Conference on Acoustics, Speech and Signal Processing, May 26, 2013, 5 pages.
Yu, et al., "Roles of Pre-Training and Fine-Tuning in Context-Dependent DBN-HMMs for Real-Word Speech Recognition", In Proceeding of NIPS Workshop on Deep Learning and Unsupervised Feature Learning, Dec. 2010, 8 pages.
U.S. Appl. No. 14/227,492, filed Mar. 27, 2014, entitled "Flexible Schema for Language Model Customization".

(56) References Cited

OTHER PUBLICATIONS

Liu, et al., "Language Model Combination and Adaptation using Weighted Finite State Transducers", In Proceedings of IEEE International Conference on Acoustics Speech and Signal Processing, Mar. 14, 2010, 4 pages.
Preliminary Report on Patentability dated Sep. 15, 2015 in Appln No. PCT/US2014/041014, 6 pgs.
U.S. Official Action dated Aug. 13, 2015 in U.S. Appl. No. 14/227,492, 41 pgs.
U.S. Official Action dated Sep. 29, 2015 in U.S. Appl. No. 13/923,917, 9 pgs.
U.S. Official Action dated Oct. 1, 2015 in U.S. Appl. No. 13/920,323, 34 pgs.
Notice of Allowance dated Oct. 1, 2015 in U.S. Appl. No. 13/923,969, 7 pgs.
Notice of Allowance dated Nov. 30, 2015 in U.S. Appl. No. 13/923,969, 12 pgs.
International Search Report and Written Opinion Issued in PCT Application No. PCT/US2014/041014, Mailed Date: Oct. 2, 2014, 9 pages.
International Search Report and Written Opinion Issued in PCT Application No. PCT/US2014/041023, Mailed Date: Jun. 3, 2015, 17 pages.
International Search Report and Written Opinion Issued in PCT Application No. PCT/US2015/017872, Mailed Date: Jun. 25, 2015, 11 pages.
International Search Report and Written Opinion Issued in PCT Application No. PCT/US2015/029334, Mailed Date: Jul. 7, 2015, 12 pages.
Bohus, et al., "Olympus: An Open-Source Framework for Conversational Spoken Language Interface Research", In Proceedings of the Workshop on Bridging the Gap: Academic and Industrial Research in Dialog Technologies, Apr. 2007, 8 pages.
Chandrasekaran et al., "Sparse and Low-Rank Matrix Decompositions"; IFAC Symposium on System Identification, 2009; 6 pgs. (Sep. 24, 2015 OA).
Dos Reis Mota, Pedro Jose, "LUP: A Language Understanding Platform", A Dissertation for the Degree of Master of Information Systems and Computer Engineering, Jul. 2012, 128 pages.
Eagle, et al., "Common Sense Conversations: Understanding Casual Conversation using a Common Sense Database", In Proceedings of the Artificial Intelligence, Information Access, and Mobile Computing Workshop, Aug. 2003, 6 pages.
He et al; "What is Discriminative Learning"; Achorn International; Jun. 25, 2008; 25 pgs. (Jul. 7, 2015 ISR).
Hoffmeister et al., "Log-Linear Model Combination with Word-Dependent Scaling Factors"; Human Language Technology and Pattern Recognition Computer Science Department; Sep. 6-10; Brighton UK; Copyright © 2009 ISCA; 4 pgs. (cited in Jul. 7, 2015 ISR).
Huang et al., "Unified Stochastic Engine (USE) for Speech Recognition"; School of Computer Science; 1993 IEEE; 4 pgs. (Jul. 7, 2015 ISR).
"Integrated Development Environments for Natural Language Processing", Published on: Oct. 2001, Available at: http://www.textanalysis.com/TAI-IDE-WP.pdf; 13 pgs.
Keshtkar et al., "A Corpus-based Method for Extracting Paraphrases of Emotion Terms"; Proceedings of the NAACL HLT 2010 Workshop on Computational Appraoches to Analysis and Generation of Emotion in Text; Jun. 2010; 10 pgs. (Jun. 3, 2015 ISR).
Ko, et al., "Cammia—A Context-Aware Spoken Dialog System for Mobile Environments", In Automatic Speech Recognition and Understanding Workshop, Jul. 29, 2011, 2 pages.
Lee, et al., "Intention-Based Corrective Feedback Generationusing Context-Aware Model", In Proceedings of the Second International Conference on Computer Supported Education, Apr. 7, 2010, 8 pages.

Moreira, et al., "Towards the Rapid Development of a Natural Language Understanding Module", In Proceedings of the 10th International Conference on Intelligent Virtual Agents, Jan. 2011, 7 pages.
Sarukkai et al., "Word Set Probability Boosting for Improved Spontaneous Dialog Recognition"; IEEE Transactions on Speech and Audio Processing, vol. 5, No. 5, Sep. 1997; 13 pgs. (Jul. 7, 2015 ISR).
Seneff, et al., "Galaxy-II: A Reference Architecture for Conversational System Development", In Proceedings of the 5th International Conference on Spoken Language Processing, Nov. 2008, 4 pages.
Sing, et al., "Domain Metric Knowledge Model for Embodied Conversation Agents", In 5th International Conference on Research, Innovation & Vision for the Future, Mar. 5, 2007, 7 pages.
Xue, et al., "Singular Value Decomposition Based Low-Footprint Speaker Adaptation and Personalization for Deep Neural Network", In Proceedings of the IEEE International Conference on Acoustics, Speech and Signal Processing, May 4, 2014, pp. 6359-6363 (Jun. 25, 2015 ISR).
U.S. Official Action dated May 6, 2015 in U.S. Appl. No. 13/923,969, 12 pgs.
Response dated May 21, 2015 in U.S. Appl. No. 13/920,323, 15 pgs.
U.S. Official Action dated May 28, 2015 in U.S. Appl. No. 13/923,917, 18 pgs.
U.S. Official Action dated Jul. 1, 2015 in U.S. Appl. No. 14/201,704, 17 pgs.
Response dated Aug. 6, 2015 in U.S. Appl. No. 13/923,969, 7 pgs.
Response dated Aug. 7, 2015 in U.S. Appl. No. 13/923,917, 10 pgs.
U.S. Official Action dated Sep. 24, 2015 in U.S. Appl. No. 13/920,323, 25 pgs.
U.S. Appl. No. 14/273,100, Amendment and Response filed Jun. 2, 2016, 12 pages.
Xiaodong, et al., "Discriminative Learning for Speech Recognition: Theory and Practice", In Book on Discriminative Learning for Speech Recognition: Theory and Practice, Chapter 1, Aug. 12, 2008, 25 pages.
European Official Communication in Application 14736143.0, mailed Feb. 2, 2016, 2 pgs.
European Official Communication in Application 14736140.6, mailed Jan. 28, 2016, 2 pgs.
PCT 2nd Written Opinion in International Application PCT/US2015/029334, mailed Mar. 31, 2016, 5 pgs.
U.S. Appl. No. 13/920,323, Office Action mailed Apr. 5, 2016, 23 pgs.
U.S. Appl. No. 13/923,969, Notice of Allowance mailed Feb. 18, 2016, 2 pgs.
Notice of Allowance dated Mar. 4, 2016 in U.S. Appl. No. 13/923,917, 5 pgs.
U.S. Appl. No. 13/923,917, Notice of Allowance mailed Mar. 21, 2016, 2 pgs.
U.S. Appl. No. 14/227,492, Notice of Allowance mailed Apr. 19, 2016, 16 pgs.
U.S. Appl. No. 14/201,704, Amendment after Allowance filed Feb. 24, 2016, 6 pgs.
U.S. Appl. No. 14/201,704, USPTO Response mailed Mar. 3, 2016, 2 pgs.
U.S. Appl. No. 14/273,100, Amendment and Response filed Jan. 4, 2016, 18 pgs.
U.S. Appl. No. 14/273,100, Office Action mailed Mar. 3, 2016, 19 pgs.
U.S. Appl. No. 13/923,969, Amendment after Allowance filed Feb. 29, 2016, 8 pgs.
U.S. Appl. No. 13/923,969, Notice of Allowance mailed Mar. 9, 2016, 2 pgs.
PCT Written Opinion dated Feb. 11, 2016 in Appin No. PCT/US2015/021921, 7 pgs.
PCT International Search Report and Written Opinion Issued in PCT Application No. PCT/US2015/021921, Mailed Date: Jul. 17, 2015, 11 pages.
PCT Preliminary Report on Patentability dated Nov. 13, 2015 in Appln No. PCT/US2014/041023, 7 pgs.

(56) References Cited

OTHER PUBLICATIONS

PCT Preliminary Report on Patentability dated Dec. 14, 2015 in Appln No. PCT/US2015/017872, 7 pgs.
Notice of Allowance dated Dec. 15, 2015 in U.S. Appl. No. 13/923,917, 7 pgs.
Notice of Allowance dated Dec. 18, 2015 in U.S. Appl. No. 14/201,704, 7 pgs.
U.S. Appl. No. 14/227,492, Amendment and Response filed Jan. 13, 2016, 13 pgs.
U.S. Appl. No. 15/076,125, Office Action mailed May 25, 2016, 13 pages.
U.S. Appl. No. 13/923,917, Office Action mailed Jun. 30, 2016, 10 pages.
U.S. Appl. No. 13/920,323, Amendment and Response filed Aug. 5, 2016, 23 pages.
U.S. Appl. No. 14/227,492, Notice of Allowance mailed Aug. 4, 2016, 12 pages.

* cited by examiner

SHARED HIDDEN LAYER COMBINATION FOR SPEECH RECOGNITION SYSTEMS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Many computing devices, such as smartphones, desktops, laptops, tablets, game consoles, and the like, utilize automatic speech recognition (ASR) for performing a number of tasks including voice search and short message dictation. In an effort to improve the accuracy of ASR, the use of deep neural networks (DNNs) has been proposed. DNNs are artificial neural networks with more than one hidden layer between input and output layers and may model complex non-linear relationships. DNN-derived features in Gaussian Mixture Model-Hidden Markov Model (GMM-HMM) speech recognition systems are also utilized to improve ASR performance. DNNs however, suffer from a number of drawbacks when utilized with Context Dependent-Deep Neural Network-Hidden Markov Model (CD-DNN-HMM ASR) systems as well as GMM-HMM ASR systems with DNN-derived features. These drawbacks include the inability to combine scores associated with CD-DNN-HMM and GMM-HMM with DNN-derived feature systems to further improve the accuracy of ASR. Furthermore, there are large computational costs associated with the use of DNNs as well as the current use of Principal Component Analysis (PCA) which, when utilized for ASR feature dimension reduction, results in less than optimal speech recognition accuracy. It is with respect to these considerations and others that the various embodiments of the present invention have been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments provide for providing a framework for merging automatic speech recognition (ASR) systems having a shared deep neural network (DNN) feature transformation. A received utterance may be trained utilizing a DNN feature transformation with a criterion. An output may then be generated from a top hidden layer in the feature transformation. The top hidden layer may be utilized to generate a network including a bottleneck layer and an output layer. Weights representing a feature dimension reduction may then be extracted between the top hidden layer and the bottleneck layer. Scores may then be generated and combined to merge the ASR systems which share the DNN feature transformation.

These and other features and advantages will be apparent from a reading of the following detailed description and a review of the associated drawings. It is to be understood that both the foregoing general description and the following detailed description are illustrative only and are not restrictive of the invention as claimed.

DETAILED DESCRIPTION

Embodiments provide for providing a framework for merging automatic speech recognition (ASR) systems having a shared deep neural network (DNN) feature transformation. A received utterance may be trained utilizing a DNN feature transformation with a criterion. An output may then be generated from a top hidden layer in the feature transformation. The top hidden layer may be utilized to generate a network including a bottleneck layer and an output layer. Weights representing a feature dimension reduction may then be extracted between the top hidden layer and the bottleneck layer. Scores may then be generated and combined to merge the ASR systems which share the DNN feature transformation.

In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents.

Figure 1:
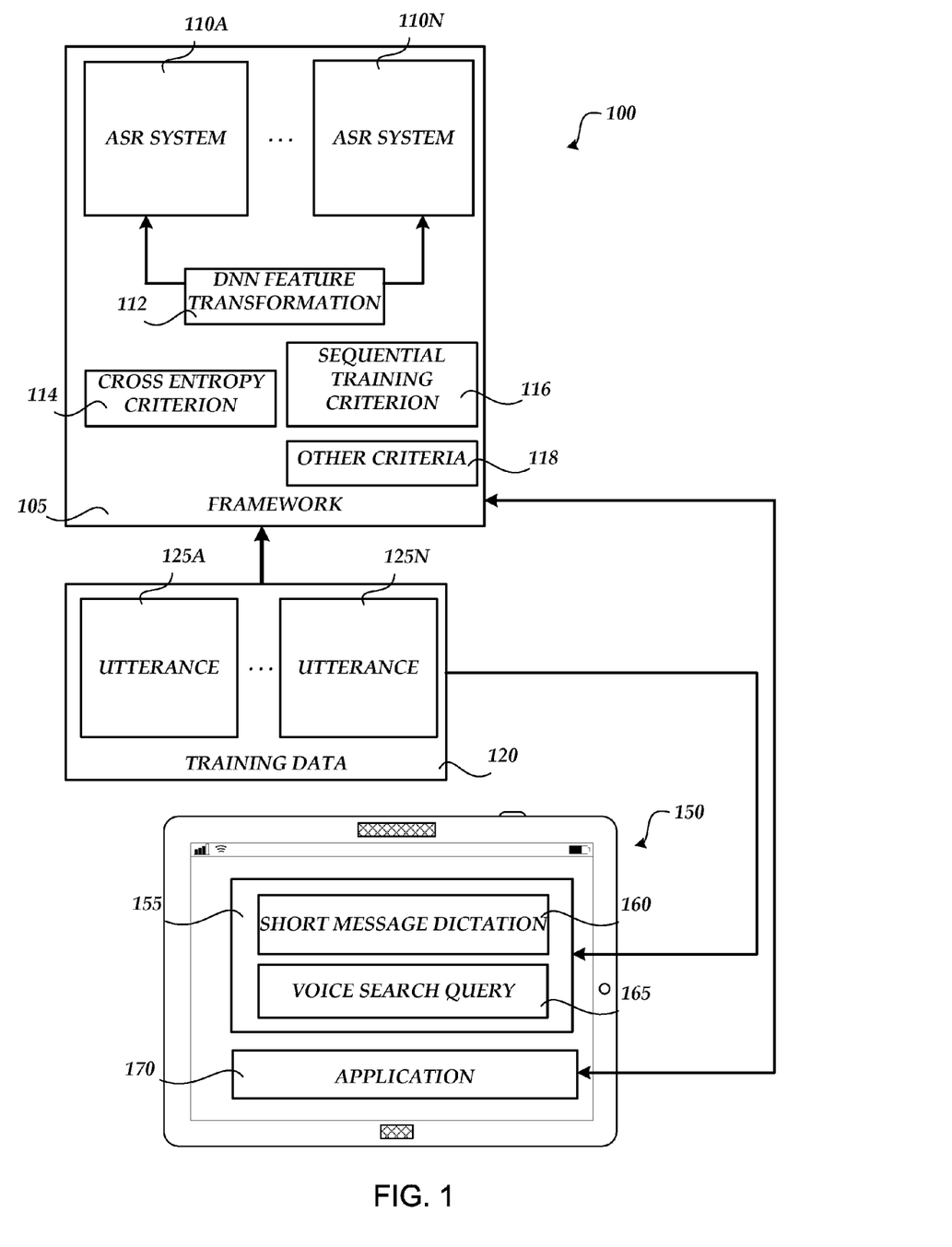
FIG. 1 is a block diagram illustrating a system for providing a framework for merging automatic speech recognition (ASR) systems having a shared deep neural network (DNN) feature transformation, in accordance with an embodiment.

Referring now to the drawings, in which like numerals represent like elements through the several figures, various aspects of the present invention will be described. FIG. 1 is a block diagram illustrating a system 100 which may be utilized for providing a framework for merging automatic speech recognition (ASR) systems having a shared deep neural network (DNN) feature transformation, in accordance with an embodiment. The system 100, which may comprise a conversational dialog system, includes a computing device 150 which may receive training data 120, comprising utterances 125A-125N, from one or more speakers. The utterances 125A-125N may be utilized to train various ASR systems (or combinations thereof) for improving recognition accuracy associated with various tasks including, without limitation, short message dictation 160 and voice search query 165, which may be displayed to a user in user interface 155.

In accordance with various embodiments, the computing device 150 may comprise, without limitation, a desktop computer, laptop computer, smartphone, video game console or a television. The computing device 150 may also comprise or be in communication with one or more recording devices (not shown) used to detect speech and receive video/pictures (e.g., MICROSOFT KINECT, microphone (s), and the like). The computing device 150 may store an application 170 which, as will be described in greater detail below, may be configured to generate framework 105. In accordance with an embodiment, the application 170 may comprise the BING VOICE SEARCH, WINDOWS PHONE SHORT MESSAGE DICTATION and XBOX MARKET PLACE VOICE SEARCH applications from MICROSOFT CORPORATION of Redmond Wash. It should be understood, however, that other applications (including operating systems) from other manufacturers may alternatively be utilized in accordance with the various embodiments described herein.

The framework 105 may include multiple ASR systems 110A-110N, DNN feature transformation 112, cross entropy criterion 114, sequential criterion 116 and other criteria 118. The ASR systems 110A-110N may collectively share the DNN feature transformation 112. In some embodiments, the ASR systems 110A-110N may comprise at least two distinct ASR systems including, without limitation, Context Dependent-Dynamic Neural Network-Hidden Markov Model (CD-DNN-HMM) systems and Gaussian Mixture Model-Hidden Markov Model (GMM-HMM) systems. As will be described in greater detail below, the framework 105 may be utilized to merge multiple (i.e., two or more) instances of the ASR systems 110A-110N by generating scores (i.e., log likelihoods) which are trained with a criterion such as the cross entropy criterion 114 or the sequential criterion 116.

Figure 2:
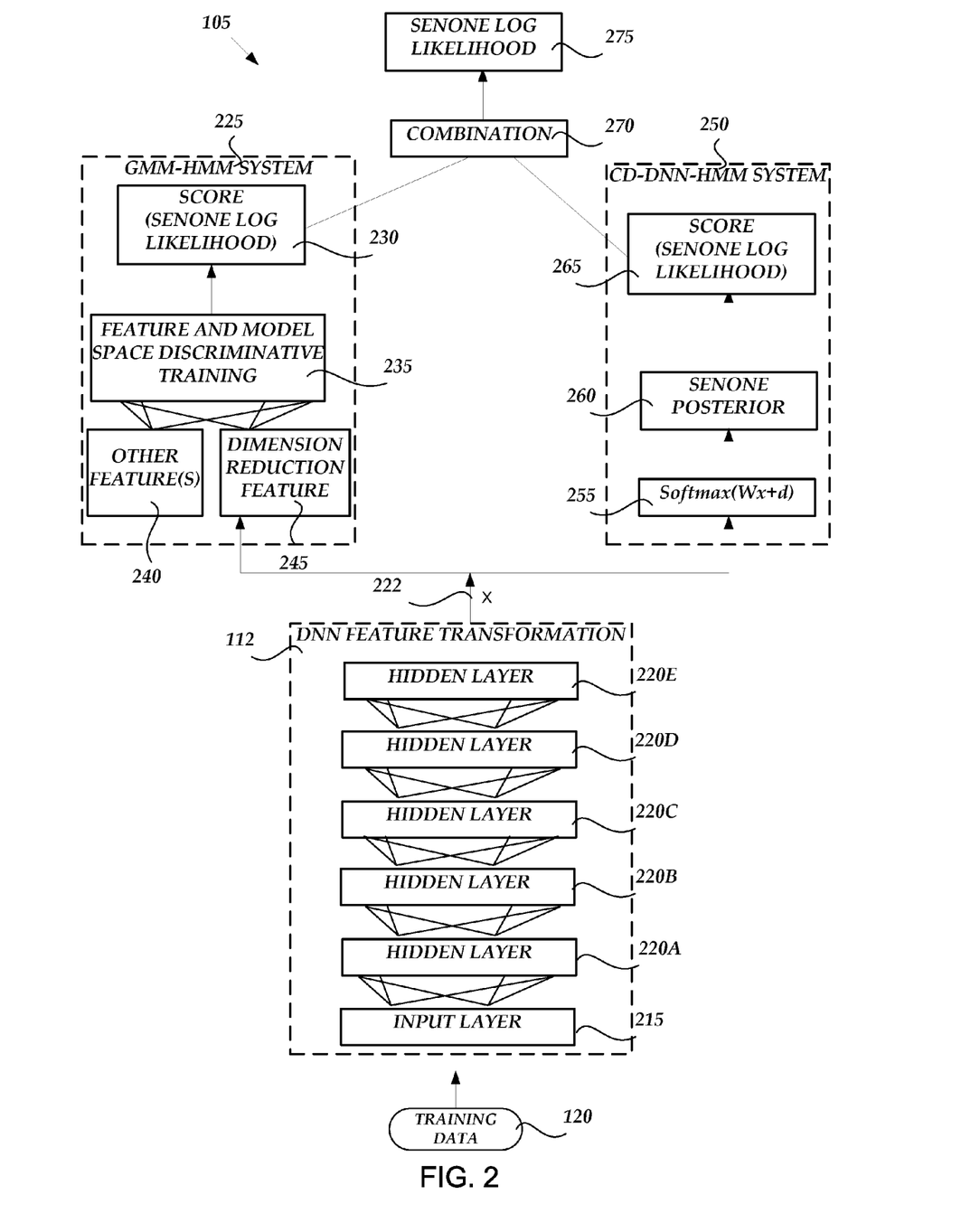
FIG. 2 is a block diagram illustrating various components of a framework for merging ASR systems having a shared DNN feature transformation, in accordance with an embodiment.

FIG. 2 is a block diagram illustrating various components of the framework 105 which may be utilized for merging ASR systems having a shared DNN feature transformation, in accordance with an embodiment. The framework 105 includes the DNN feature transformation 112, one or more GMM-HMM systems 225 (hereinafter referred to as GMM system 225) and a CD-DNN-HMM 250 (hereinafter referred to as DNN system 250). In the framework 105, the DNN feature transformation 112 receives the training data 120. The DNN feature transformation 112 may include an input layer 215 and multiple hidden layers 220A-220E. It should be understood that the input layer 215 may comprise a non-hidden (i.e., visible) layer consisting of a window of acoustic feature frames received from the training data 120. It should be understood that the DNN feature transformation 112 may include additional layers than those previously described (i.e., the layers 220A-220E). Moreover, each of the hidden layers 220A-220E may further comprise a number of nodes "l" (e.g., greater than 1000, not shown).

The output 222 of the top hidden layer (i.e., the hidden layer 220E) may comprise an l-dimension vector "x" (where "l" represents the number of nodes in the hidden layer 220E) which is passed to the DNN system 250 and to the GMM system 225. In the DNN system 250, a Softmax function 255 may be utilized to generate a senone posterior 260 from the dimension vector "x" which is transformed with a weight matrix W and a bias (i.e., vector) d. Thus, in accordance with an embodiment, the Softmax function 255 may be represented as: Softmax(Wx+d). The senone posterior 260 may then be converted to a score 265 which may comprise a senone log likelihood for the DNN system 250. As should be understood by those skilled in the art of speech recognition, speech may be modeled as sound fragments. "Senones" are used to represent thousands of sound fragments which are utilized by DNNs in the recognition of speech.

In the GMM system 225, the l-dimension vector "x" is reduced to a vector with a relative small dimension by dimension reduction feature 245 and then optionally combined with other feature(s) 240. The other feature(s) 240 may include, without limitation, features for better discriminating sound or information about node, channel or speaker data in an utterance. The dimension reduction feature 245 will be described in greater detail below with respect to FIG. 3. The GMM system 225 may further utilize a feature and model space discriminative training module 235 for further improving recognition accuracy and for generating score 230 which may comprise a senone log likelihood for the GMM system 225. As will be described in greater detail below with respect to FIG. 4, the scores 230 and 265 (i.e., the log likelihoods from the GMM system 225 and the DNN system 250) may be combined (either linearly or via the use of a complex function) utilizing combination module 270 to generate senone log likelihood 275 representing a final combined score of the scores 230 and 265.

In some embodiments, the DNN system 250 may be implemented on the computing device 150 described above with respect to FIG. 1. It should further be understood that while only two ASR systems (i.e., the GMM system 225 and the DNN system 250) are shown in FIG. 2, the framework 105 may be utilized for merging additional ASR systems (i.e., more than two) in some embodiments. Examples of additional ASR systems include a GMM-HMM system trained with a combined feature space Minimum Phone Error (fMPE) and MPE criterion (i.e., fMPE+MPE criterion) and a GMM-HMM system trained with a Region Dependent Linear Transform (RDLT) and boosted Maximum Mutual Information (bMMI) criterion (i.e., RDLT+bMMI criterion). In some embodiments, the GMM system 225 as well as the aforementioned additional ASR systems may comprise back end systems. In some embodiments, one or more of the ASR systems 110A-110N may also comprise back end systems. In some embodiments, different ASR systems with different dimension reduction methods may also be combined.

Figure 3:
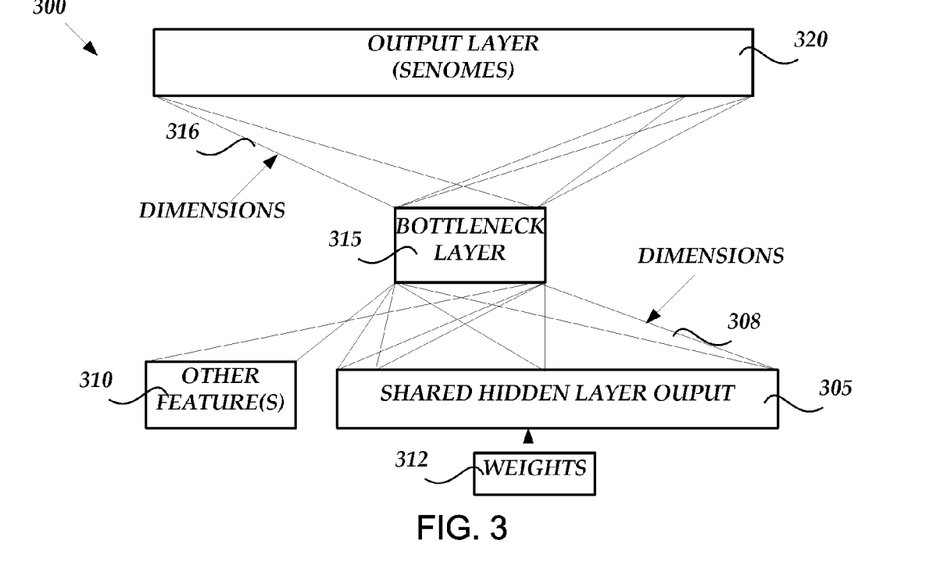
FIG. 3 is a block diagram illustrating the utilization of a bottleneck layer for dimension reduction in the framework of FIG. 2, in accordance with an embodiment.

Turning now to FIG. 3, a block diagram of a network 300 is shown which includes the utilization of a bottleneck layer for the dimension reduction discussed above with respect to the framework 105 of FIG. 2, in accordance with an embodiment. In the network 300, shared hidden layer output 305 may correspond to output 222 from the top hidden layer 220E and the other (optional) feature(s) 310 may correspond to the other feature(s) 240 discussed above with respect to FIG. 2. The shared hidden layer output 305 and the other feature(s) 310 may comprise inputs to the bottleneck layer 315 for dimension reduction. For example, the shared hidden layer output 305 may comprise a vector having a relatively large number of dimensions 308 (e.g., on the order of 2000 dimensions) which is reduced by the bottleneck layer 315 (i.e., a low-dimension bottleneck layer) to a relatively small number of dimensions 316 (e.g., on the order of 39 dimensions). Output layer 320 is on top of the bottleneck layer 315 and may comprise senones (i.e., senones as a target of the output layer). In some embodiments, optional hidden layers (not shown) may also be on top of the bottleneck layer 315. It should be understood that in some embodiments, the network 300 may be trained using either the cross entropy criterion 114 or the sequential training criterion 116 (e.g., MMI criterion, state Minimum Bayesian Risk (sMBR) criterion, etc.). That is, the cross entropy criterion 114 or the sequential training criterion 116 may be utilized to optimize dimension reduction (i.e., a dimension reduction matrix) in order to optimize the senone classification or speech recognition accuracy of the training data 120. It should further be understood that weights 312 may also be utilized between the input layer (i.e., the top hidden layer 220E of FIG. 1) and the bottleneck layer 315 as the dimension reduction matrix for the shared hidden layer output 305.

Figure 4:
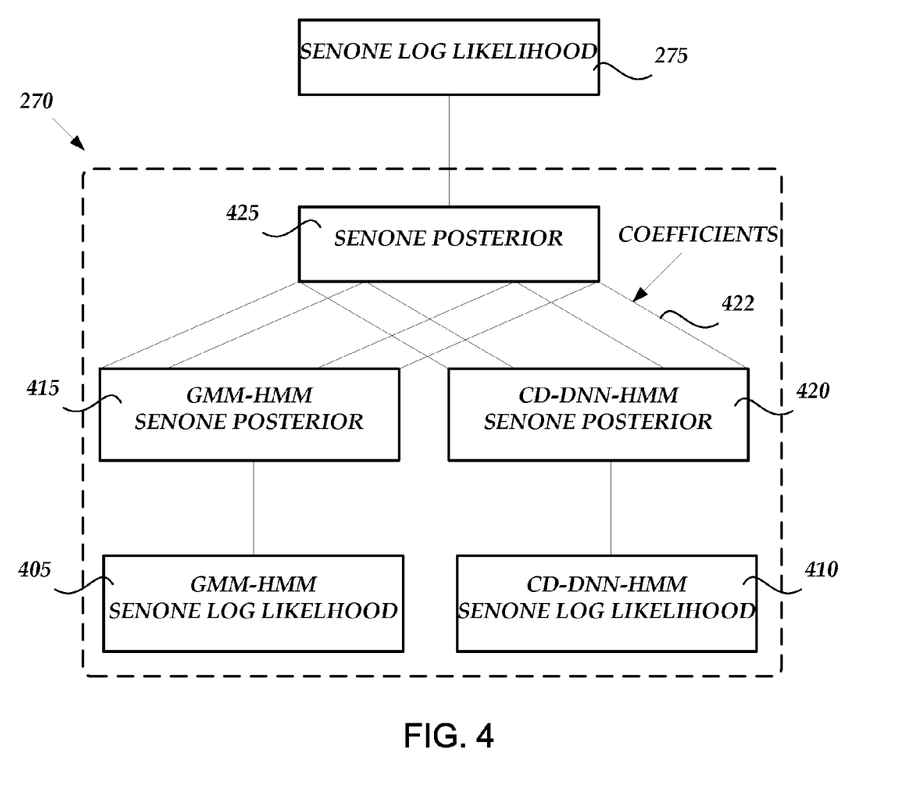
FIG. 4 is a block diagram illustrating the combination of log likelihood coefficients from multiple ASR systems to generate the senone log likelihood in the framework of FIG. 2, in accordance with an embodiment.

FIG. 4 is a block diagram illustrating the combination 270 of log likelihood coefficients from multiple ASR systems to generate the senone log likelihood 275 in the framework 105 of FIG. 2, in accordance with an embodiment. The combination 270 includes a senone log likelihood and senone posterior for the GMM system 225 (i.e., GMM-HMM senone log likelihood 405 and GMM-HMM senone log likelihood 415) and a senone log likelihood and senone posterior for the DNN system 250 (i.e., the CD-DNN-HMM senone log likelihood 410 and the CD-DNN-HMM senone posterior 420). It should be understood, that in some embodiments, the log likelihood scores from the GMM system 225 and the DNN system 250 may be converted to senone posteriors and connected to combination coefficients (i.e., coefficients 422) to generate final senone posteriors (i.e., senone posterior 425). The combination coefficients 422 may then be optimized with either the cross entropy criterion 114 or the sequential training criterion 116. During runtime of the framework 105, the final senone posteriors may be converted to final log likelihood scores (i.e., the senone log likelihood 275) for hypothesis decoding.

Figure 5:
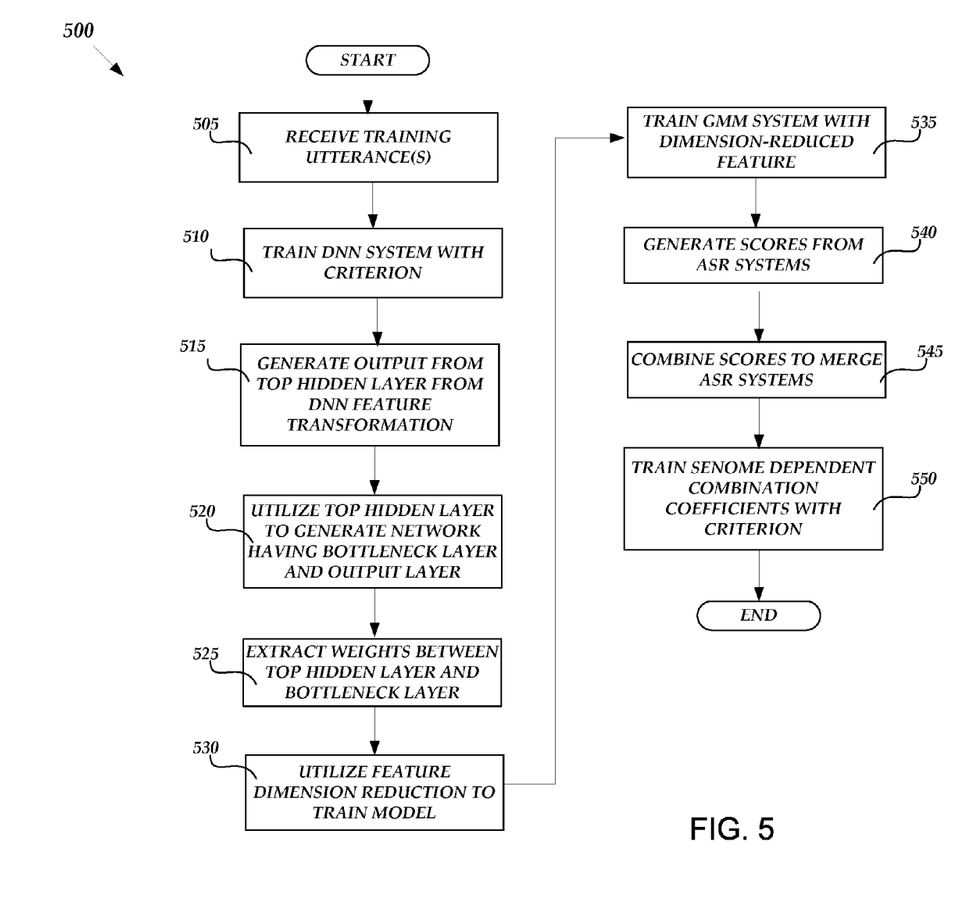
FIG. 5 is a flow diagram illustrating a routine for providing a framework for merging ASR systems having a shared DNN feature transformation, in accordance with an embodiment.

FIG. 5 is a flow diagram illustrating a routine 500 for providing a framework for merging ASR systems having a shared DNN feature transformation, in accordance with an embodiment. When reading the discussion of the routines presented herein, it should be appreciated that the logical operations of various embodiments of the present invention are implemented (1) as a sequence of computer implemented acts or program modules running on a computing system and/or (2) as interconnected machine logical circuits or circuit modules within the computing system. The implementation is a matter of choice dependent on the performance requirements of the computing system implementing the invention. Accordingly, the logical operations illustrated in FIG. 5 and making up the various embodiments described herein are referred to variously as operations, structural devices, acts or modules. It will be recognized by one skilled in the art that these operations, structural devices, acts and modules may be implemented in software, in hardware, in firmware, in special purpose digital logic, and any combination thereof without deviating from the spirit and scope of the present invention as recited within the claims set forth herein.

The routine 500 begins at operation 505, where the application 170 executing on the computing device 150 may receive one or more of the utterances 125A-125N (i.e., training utterances) from the training data 120.

From operation 505, the routine 500 continues to operation 510, where the application 170 executing on the computing device 150 may train the DNN system 250 from which DNN feature transformation 112 is derived with the a criterion utilizing the received one or more training utterances 125A-125N. As discussed above, the DNN feature transformation 112 may include the hidden layers 220A-220E (it should be understood that in some embodiments, the DNN feature transformation 112 may have more or fewer hidden layers than those shown in FIG. 2). In some embodiments, the DNN system 250 may be trained with the cross entropy criterion 114. In other embodiments, the DNN system 250 may be trained with the sequential training criterion 116.

From operation 510, the routine 500 continues to operation 515, where the application 170 executing on the computing device 150 may generate the output 222 from the top hidden layer 220E from the DNN feature transformation 112.

From operation 515, the routine 500 continues to operation 520, where the application 170 executing on the computing device 150 may utilize the top hidden layer 220A to generate the network 300 having the bottleneck layer 315 and the output layer 320. As discussed above with respect to FIG. 3, the bottleneck layer 315 may comprise a low-dimension bottleneck layer and the output layer 320 may comprise senones.

From operation 520, the routine 500 continues to operation 525, where the application 170 executing on the computing device 150 may extract one or more of the weights 312 between the top hidden layer 220E and the bottleneck layer 315. The weights 312 may represent a feature dimension reduction.

From operation 525, the routine 500 continues to operation 530, where the application 170 executing on the computing device 150 may utilize feature dimension reduction to train a model. In particular, the application 170 may utilize the feature and model space discriminative training module 235 described above with respect to FIG. 2.

From operation 530, the routine 500 continues to operation 535, where the GMM system 225 is trained based on the dimension-reduced feature.

From operation 535, the routine 500 continues to operation 540, where the application 170 executing on the computing device 150 may generate the scores 230 and 265 from the GMM system 225 and the DNN system 250 (i.e., the ASR systems). In generating the scores 230 and 265, the application 170 may be utilized to generate log likelihood scores from the GMM system 225 and the DNN system 250.

From operation 540, the routine 500 continues to operation 545, where the application 170 executing on the computing device 150 may combine the scores 230 and 265 to merge the GMM system 225 and the DNN system 250 which share the DNN feature transformation 112. In particular, the application 170 may utilized the combination module 270 to perform either a linear or non-linear (i.e., complex) combination of the scores 230 and 265.

From operation 545, the routine 500 continues to operation 550, where the application 170 executing on the computing device 150 may train senone dependent coefficients (i.e., the coefficients 422) with a criterion (i.e., either the cross entropy criterion 114 or the sequential training criterion 116). From operation 550, the routine 500 then ends.

Figure 6:
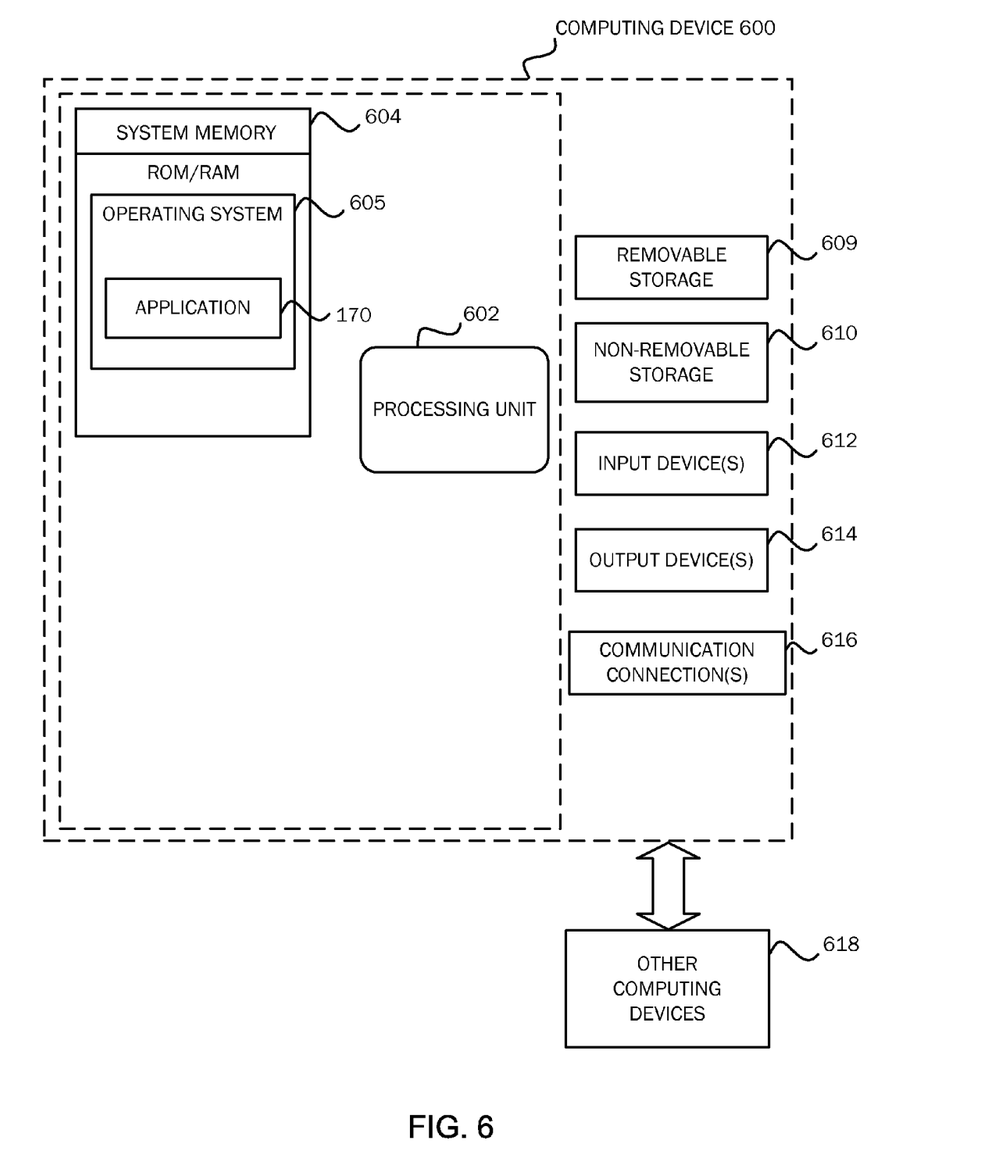
FIG. 6 is a simplified block diagram of a computing device with which various embodiments may be practiced.
Figure 7A:
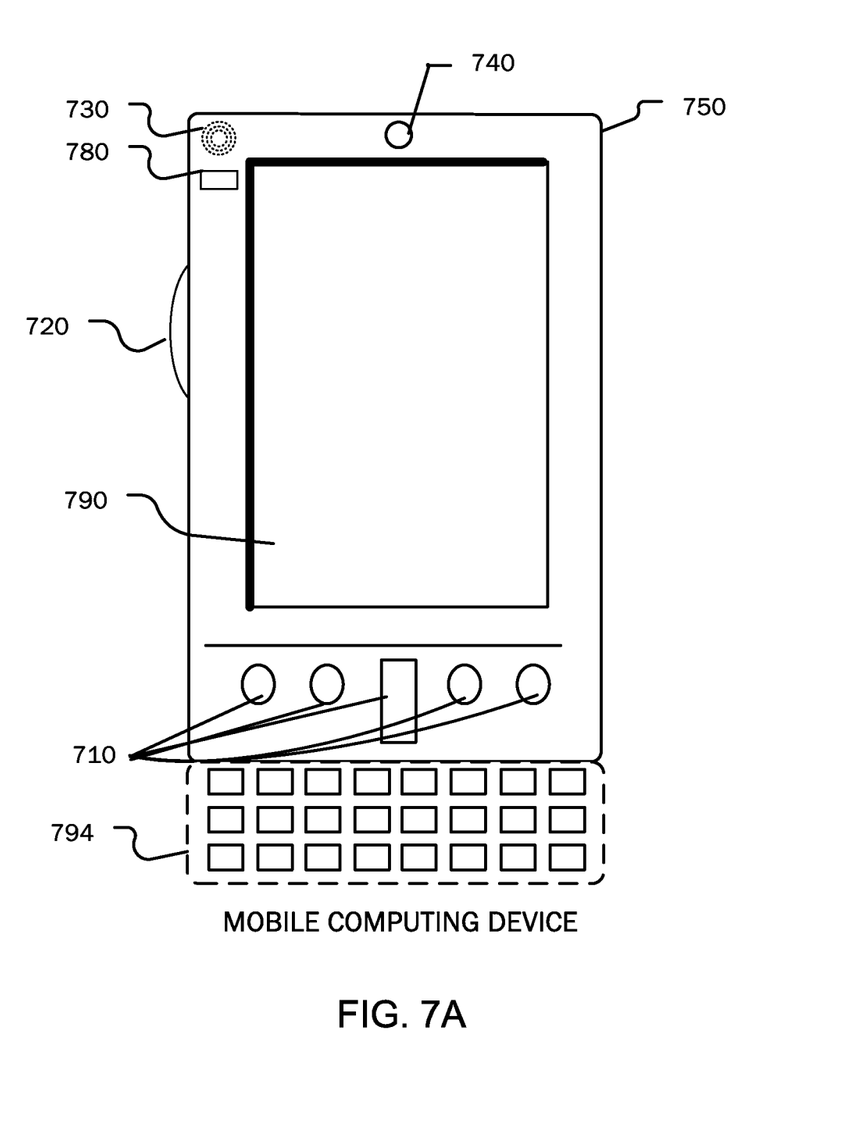
FIG. 7A is a simplified block diagram of a mobile computing device with which various embodiments may be practiced.
Figure 7B:
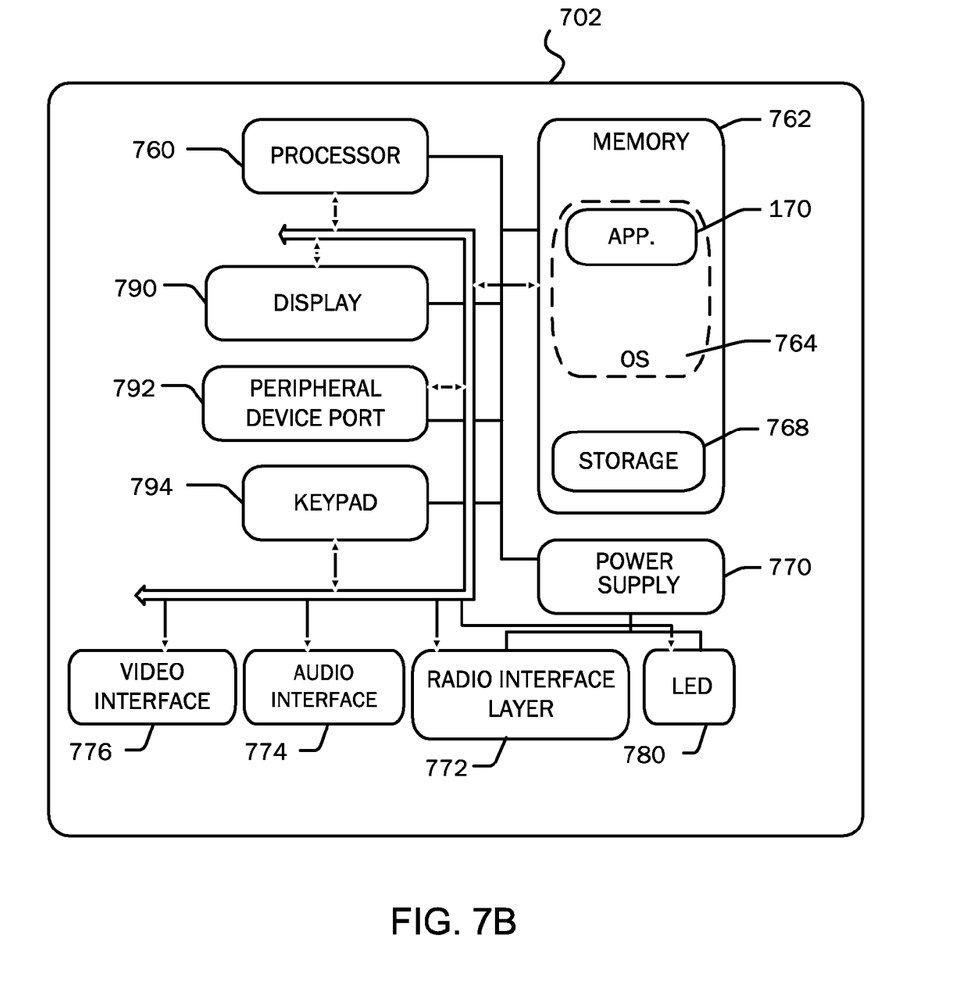
FIG. 7B is a simplified block diagram of a mobile computing device with which various embodiments may be practiced.
Figure 8:
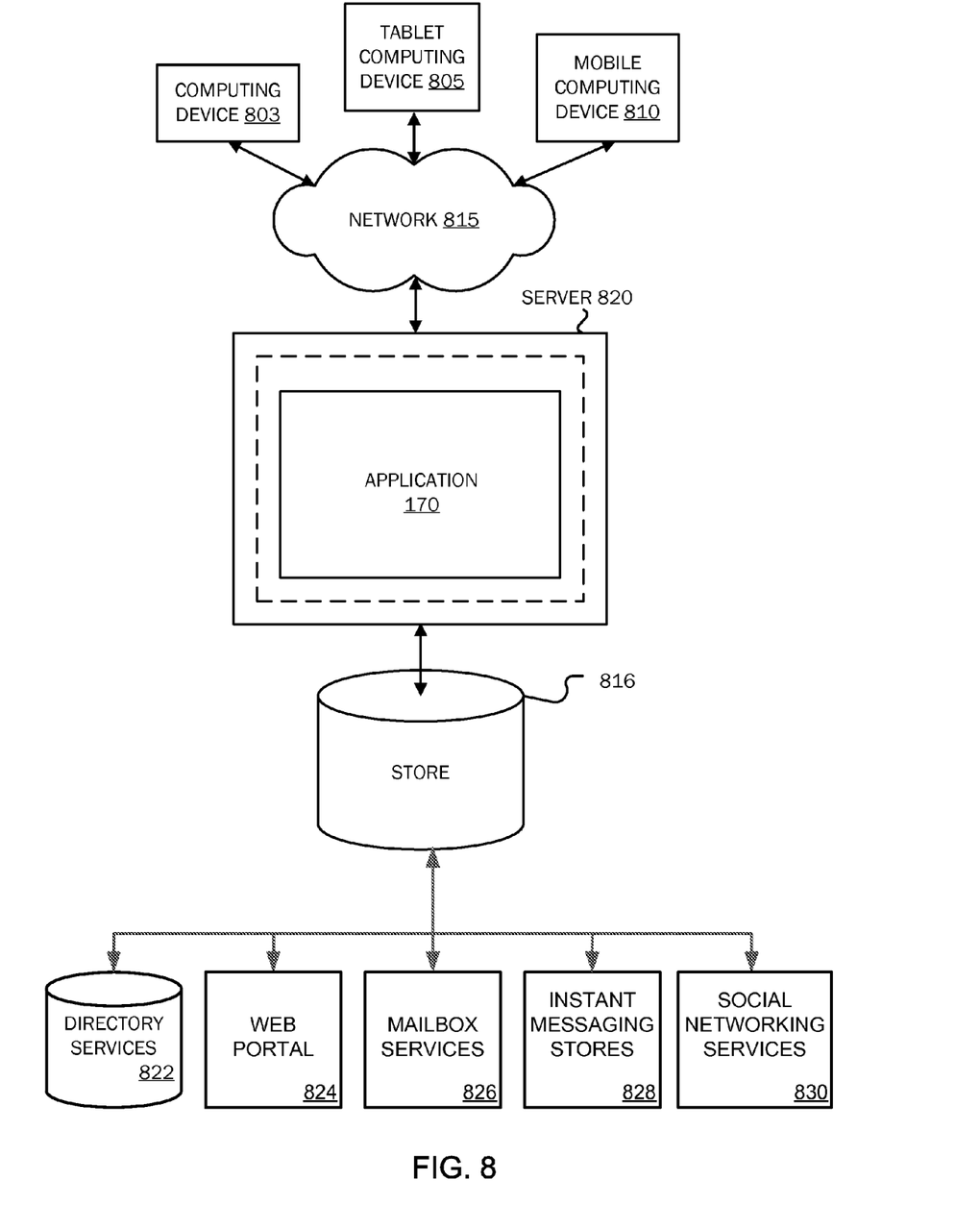
FIG. 8 is a simplified block diagram of a distributed computing system in which various embodiments may be practiced.

FIGS. 6-8 and the associated descriptions provide a discussion of a variety of operating environments in which embodiments of the invention may be practiced. However, the devices and systems illustrated and discussed with respect to FIGS. 6-8 are for purposes of example and illustration and are not limiting of a vast number of computing device configurations that may be utilized for practicing embodiments of the invention, described herein.

FIG. 6 is a block diagram illustrating example physical components of a computing device 600 with which various embodiments may be practiced. In a basic configuration, the computing device 600 may include at least one processing unit 602 and a system memory 604. Depending on the configuration and type of computing device, system memory 604 may comprise, but is not limited to, volatile (e.g. random access memory (RAM)), non-volatile (e.g. read-only memory (ROM)), flash memory, or any combination. System memory 604 may include an operating system 605 and application 170. Operating system 605, for example, may be suitable for controlling the computing device 600's operation and, in accordance with an embodiment, may comprise the WINDOWS operating systems from MICROSOFT CORPORATION of Redmond, Wash. The application 170 (which, in some embodiments, may be included in the operating system 605) may comprise functionality for performing routines including, for example, providing a framework for merging automatic speech recognition (ASR) systems having a shared DNN feature transformation, as described above with respect to the operations in routine 500 of FIG. 5.

The computing device 600 may have additional features or functionality. For example, the computing device 600 may also include additional data storage devices (removable and/or non-removable) such as, for example, magnetic disks, optical disks, solid state storage devices ("SSD"), flash memory or tape. Such additional storage is illustrated in FIG. 6 by a removable storage 609 and a non-removable storage 610. The computing device 600 may also have input device(s) 612 such as a keyboard, a mouse, a pen, a sound input device (e.g., a microphone), a touch input device for receiving gestures, an accelerometer or rotational sensor, etc. Output device(s) 614 such as a display, speakers, a printer, etc. may also be included. The aforementioned devices are examples and others may be used. The computing device 600 may include one or more communication connections 616 allowing communications with other computing devices 618. Examples of suitable communication connections 616 include, but are not limited to, RF transmitter, receiver, and/or transceiver circuitry; universal serial bus (USB), parallel, and/or serial ports.

Furthermore, various embodiments may be practiced in an electrical circuit comprising discrete electronic elements, packaged or integrated electronic chips containing logic gates, a circuit utilizing a microprocessor, or on a single chip containing electronic elements or microprocessors. For example, various embodiments may be practiced via a system-on-a-chip ("SOC") where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein may operate via application-specific logic integrated with other components of the computing device/system 600 on the single integrated circuit (chip). Embodiments may also be practiced using other technologies capable of performing logical operations such as, for example, AND, OR, and NOT, including but not limited to mechanical, optical, fluidic, and quantum technologies. In addition, embodiments may be practiced within a general purpose computer or in any other circuits or systems.

The term computer readable media as used herein may include computer storage media. Computer storage media may include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 7A and 7B illustrate a suitable mobile computing environment, for example, a mobile computing device 750 which may include, without limitation, a smartphone, a tablet personal computer, a laptop computer and the like, with which various embodiments may be practiced. With reference to FIG. 7A, an example mobile computing device 750 for implementing the embodiments is illustrated. In a basic configuration, mobile computing device 750 is a handheld computer having both input elements and output elements. Input elements may include touch screen display 725 and input buttons 710 that allow the user to enter information into mobile computing device 750. Mobile computing device 750 may also incorporate an optional side input element 720 allowing further user input. Optional side input element 720 may be a rotary switch, a button, or any other type of manual input element. In alternative embodiments, mobile computing device 750 may incorporate more or less input elements. In yet another alternative embodiment, the mobile computing device is a portable telephone system, such as a cellular phone having display 725 and input buttons 710. Mobile computing device 750 may also include an optional keypad 705. Optional keypad 705 may be a physical keypad or a "soft" keypad generated on the touch screen display.

Mobile computing device 750 incorporates output elements, such as display 725, which can display a graphical user interface (GUI). Other output elements include speaker 730 and LED 780. Additionally, mobile computing device 750 may incorporate a vibration module (not shown), which causes mobile computing device 750 to vibrate to notify the user of an event. In yet another embodiment, mobile computing device 750 may incorporate a headphone jack (not shown) for providing another means of providing output signals.

Although described herein in combination with mobile computing device 750, in alternative embodiments may be used in combination with any number of computer systems, such as in desktop environments, laptop or notebook computer systems, multiprocessor systems, micro-processor based or programmable consumer electronics, network PCs, mini computers, main frame computers and the like. Various embodiments may also be practiced in distributed computing environments where tasks are performed by remote processing devices that are linked through a communications network in a distributed computing environment; programs may be located in both local and remote memory storage devices. To summarize, any computer system having a plurality of environment sensors, a plurality of output elements to provide notifications to a user and a plurality of notification event types may incorporate the various embodiments described herein.

FIG. 7B is a block diagram illustrating components of a mobile computing device used in one embodiment, such as the mobile computing device 750 shown in FIG. 7A. That is, mobile computing device 750 can incorporate a system 702 to implement some embodiments. For example, system 702 can be used in implementing a "smartphone" that can run one or more applications similar to those of a desktop or notebook computer. In some embodiments, the system 702 is integrated as a computing device, such as an integrated personal digital assistant (PDA) and wireless phone.

Application 170 may be loaded into memory 762 and run on or in association with an operating system 764. The system 702 also includes non-volatile storage 768 within memory the 762. Non-volatile storage 768 may be used to store persistent information that should not be lost if system 702 is powered down. The application 170 may use and store information in the non-volatile storage 768. The application 170, for example, may comprise functionality for performing routines including, for example, providing a framework for merging automatic speech recognition (ASR) systems having a shared DNN feature transformation, as described above with respect to the operations in routine 500 of FIG. 5.

A synchronization application (not shown) also resides on system 702 and is programmed to interact with a corresponding synchronization application resident on a host computer to keep the information stored in the non-volatile storage 768 synchronized with corresponding information stored at the host computer. As should be appreciated, other applications may also be loaded into the memory 762 and run on the mobile computing device 750.

The system 702 has a power supply 770, which may be implemented as one or more batteries. The power supply 770 might further include an external power source, such as an AC adapter or a powered docking cradle that supplements or recharges the batteries.

The system 702 may also include a radio 772 (i.e., radio interface layer) that performs the function of transmitting and receiving radio frequency communications. The radio 772 facilitates wireless connectivity between the system 702 and the "outside world," via a communications carrier or service provider. Transmissions to and from the radio 772 are conducted under control of OS 764. In other words, communications received by the radio 772 may be disseminated to the application 170 via OS 764, and vice versa.

The radio 772 allows the system 702 to communicate with other computing devices, such as over a network. The radio 772 is one example of communication media. The embodiment of the system 702 is shown with two types of notification output devices: the LED 780 that can be used to provide visual notifications and an audio interface 774 that can be used with speaker 730 to provide audio notifications. These devices may be directly coupled to the power supply 770 so that when activated, they remain on for a duration dictated by the notification mechanism even though processor 760 and other components might shut down for conserving battery power. The LED 780 may be programmed to remain on indefinitely until the user takes action to indicate the powered-on status of the device. The audio interface 774 is used to provide audible signals to and receive audible signals from the user. For example, in addition to being coupled to speaker 730, the audio interface 774 may also be coupled to a microphone (not shown) to receive audible (e.g., voice) input, such as to facilitate a telephone conversation. In accordance with embodiments, the microphone may also serve as an audio sensor to facilitate control of notifications. The system 702 may further include a video interface 776 that enables an operation of on-board camera 740 to record still images, video streams, and the like.

A mobile computing device implementing the system 702 may have additional features or functionality. For example, the device may also include additional data storage devices (removable and/or non-removable) such as, magnetic disks, optical disks, or tape. Such additional storage is illustrated in FIG. 7B by storage 768.

Data/information generated or captured by the mobile computing device 750 and stored via the system 702 may be stored locally on the mobile computing device 750, as described above, or the data may be stored on any number of storage media that may be accessed by the device via the radio 772 or via a wired connection between the mobile computing device 750 and a separate computing device associated with the mobile computing device 750, for example, a server computer in a distributed computing network such as the Internet. As should be appreciated such data/information may be accessed via the mobile computing device 750 via the radio 772 or via a distributed computing network. Similarly, such data/information may be readily transferred between computing devices for storage and use according to well-known data/information transfer and storage means, including electronic mail and collaborative data/information sharing systems.

FIG. 8 is a simplified block diagram of a distributed computing system in which various embodiments may be practiced. The distributed computing system may include number of client devices such as a computing device 803, a tablet computing device 805 and a mobile computing device 810. The client devices 803, 805 and 810 may be in communication with a distributed computing network 815 (e.g., the Internet). A server 820 is in communication with the client devices 803, 805 and 810 over the network 815. The server 820 may store application 170 which may be perform routines including, for example, providing a framework for merging automatic speech recognition (ASR) systems having a shared DNN feature transformation, as described above with respect to the operations in routine 500 of FIG. 5.

Content developed, interacted with, or edited in association with the application 170 may be stored in different communication channels or other storage types. For example, various documents may be stored using a directory service 822, a web portal 824, a mailbox service 826, an instant messaging store 828, or a social networking site 830. The application 170 may use any of these types of systems or the like for enabling data utilization, as described herein. The server 820 may provide the proximity application 170 to clients. As one example, the server 820 may be a web server providing the application 170 over the web. The server 820 may provide the application 170 over the web to clients through the network 815. By way of example, the computing device 10 may be implemented as the computing device 803 and embodied in a personal computer, the tablet computing device 805 and/or the mobile computing device 810 (e.g., a smart phone). Any of these embodiments of the computing devices 803, 805 and 810 may obtain content from the store 816.

Various embodiments are described above with reference to block diagrams and/or operational illustrations of methods, systems, and computer program products. The functions/acts noted in the blocks may occur out of the order as shown in any flow diagram. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

What is claimed is:

1. A method of providing a framework for merging two or more automatic speech recognition (ASR) system having a shared deep neural network (DNN) feature transformation, comprising:
   receiving, by a computing device, at least one utterance;
   training, by the computing device, the at least one utterance using a DNN feature transformation with a criterion, wherein the DNN feature transformation comprising a plurality of hidden layers;
   generating, by the computing device, an output from a top hidden layer in the plurality of hidden layers for the at least one utterance;
   utilizing, by the computing device, the top hidden later output to generate a network comprising a bottleneck layer and an output layer;
   extracting, by the computing device, one or more weights between the top hidden layer and the bottleneck layer, the one or more weights representing a feature dimension reduction;
   generating, by the computing device, a first score from a first ASR system based on application of the feature dimension reduction to a model of the first ASR system and generating a second score from a second ASR system based on application of the feature dimension reduction to a model of the second ASR;
   combining, by the computing device, the first score and the second score to merge the first ASR system and the second ASR system to create a merged system; and
   training, for the merged system, senone coefficient data for evaluation of spoken utterances.

2. The method of claim 1, further comprising receiving a spoken utterance, and executing ASR recognition for the spoken utterance using the merged system.

3. The method of claim 2, wherein the senone coefficient data is used to evaluate the spoken utterance to determine ASR results.

4. The method of claim 1, wherein receiving, by a computing device, at least one utterance comprises receiving a plurality of training utterances for speech recognition.

5. The method of claim 1, wherein the training of the at least one utterance comprises:
   training the first ASR system with a cross entropy criterion, the first ASR system comprising a DNN system; and
   deriving the DNN feature transformation from a top hidden layer of the DNN system.

6. The method of claim 1, wherein the training of the at least one utterance comprises:
   training the first ASR system with sequential training criterion, the first ASR system comprising a DNN system; and
   deriving the DNN feature transformation from a top hidden layer of the DNN system.

7. The method of claim 1, wherein utilizing, by the computing device, the top hidden layer output to generate a network comprising a bottleneck layer and an output layer comprises generating a network comprising a low dimension bottleneck hidden layer and a plurality of senones.

8. The method of claim 1, wherein generating, by the computing device, the first score and the second score comprises generating log likelihood scores from a Context Dependent Deep Neural Network-Hidden Markov Model (CD-DNN-HMM) system and a Gaussian Mixture Model-Hidden Markov Model (GMM-HMM) system.

9. The limitation of claim 1, wherein combining, by the computing device, the first score and the second score comprises performing a linear combination of the first score from the first ASR system and the second score from the second ASR system.

10. The method of claim 1, wherein combining, by the computing device, the first score and the second score comprises performing a non-linear combination of the first score from the first ASR system and the second score from the second ASR system.

11. A system comprising:
   at least one processor; and
   a memory operatively connected with the at least one processor, wherein the memory stores computer-executable instructions that, when executed by the at least one processor, causes the at least one processor to execute a method that comprises:
   receiving, by a computing device, at least one utterance;
   training, by the computing device, the at least one utterance using a DNN feature transformation with a criterion, wherein the DNN feature transformation comprises a plurality of hidden layers;
   generating, by the computing device, an output from a top hidden layer in the plurality of hidden layers for the at least one utterance;
   utilizing, by the computing device, the top hidden layer output to generate a network comprising a bottleneck layer and an output layer;

extracting, by the computing device, one or more weights between the top hidden layer and the bottleneck layer, the one or more weights representing a feature dimension reduction;

generating, by the computing device, a first score from a first ASR system based on application of the feature dimension reduction to a model of the first ASR system and generating a second score from a second ASR system based on application of the feature dimension reduction to a model of the second ASR system;

combining, by the computing device, the first score and the second score to merge the first ASR system and the second ASR system to create a merged system; and training, for the merged system, senone coefficient data for evaluation of spoken utterances.

12. The system according to claim 11, wherein the method, executed by the at least one processor, further comprises receiving a spoken utterance, and executing ASR recognition for the spoken utterance using the merged system.

13. The system according to claim 11, wherein the training of the at least one utterance comprises: training the first ASR system with at least one of a cross entropy criterion and a sequential training criterion, and deriving the DNN feature transformation from a top hidden layer of a DNN system.

14. The system according to claim 11, wherein the generating of the first score and the second score further comprises generating log likelihood scores from a Context Dependent Deep Neural Network-Hidden Markov Model (CD-DNN-HMM) system and a Gaussian Mixture Model-Hidden Markov Model (GMM-HMM) system.

15. The system according to claim 11, wherein the combining of the first score and the second score occurs by executing at least one selected from a group consisting of: performing a non-linear combination of the first score and the second score, and performing a linear combination of the first score and the second score.

16. A computer-readable storage device storing computer executable instructions which, when executed by a computer, cause computer to perform a method of providing a framework for merging systems having a shared deep neural network (DNN) feature transformation, the method comprising:

receiving a plurality of training utterances for speech recognition;

training a first system with one or more of a cross entropy criterion and a sequential training criterion utilizing the plurality of training utterances, the DNN feature transformation comprising a plurality of hidden layers;

generating an output from a top hidden layer in the plurality of hidden layers for the plurality of training utterances;

utilizing the top hidden layer output to generate a network comprising a low dimension bottleneck hidden layer and a plurality of senones;

extracting one or more weights between the top hidden layer and the low dimension hidden bottleneck layer, the one or more weights representing a feature dimension reduction;

utilizing the feature dimension reduction to train a model for a second system following the extraction of the one or more weights between the top hidden layer and the low dimension bottleneck hidden layer;

generating a first log likelihood score from the first system based on application of the feature dimension reduction to the first system and a second log likelihood score from the second system based on application of the feature dimension to the model of the second system;

combining the first log likelihood score and the second log likelihood score to create a merged system from the first system and the second system, wherein the first system and the second system share the DNN feature transformation; and training senone dependent combination coefficients from the merged system with the one or more of the cross entropy criterion and the sequential training criterion.

17. The computer-readable storage medium, wherein the method further comprising receiving a spoken utterance, processing the spoken utterance using the senone dependent combination coefficients, and outputting automatic speech recognition (ASR) results data based on the processing of the spoken utterances.

18. The computer-readable storage device of claim 16, wherein the first system is a Context Dependent Deep Neural Network-Hidden Markov Model (CD-DNN-HMM) system and the second system is a Gaussian Mixture Model-Hidden Markov Model (GMM-HMM) system.

19. The computer-readable storage device of claim 16, wherein combining of the first log likelihood score and the second log likelihood score comprises performing a linear combination of the first log likelihood score from the first system and the second log likelihood score from the second system.

20. The computer-readable storage device of claim 16, wherein combining of the first log likelihood score and the second log likelihood score comprises performing a non-linear combination of the first log likelihood score from the first system and the second log likelihood score from the second system.

* * * * *